US012719648B2

(12) United States Patent
Sharma et al.

(10) Patent No.: US 12,719,648 B2
(45) Date of Patent: Aug. 25, 2026

(54) COMMUNICATIONS DEVICE, INFRASTRUCTURE EQUIPMENT AND METHODS

(71) Applicant: Sony Group Corporation, Tokyo (JP)

(72) Inventors: Vivek Sharma, Basingstoke (GB); Shin Horng Wong, Basingstoke (GB); Yassin Aden Awad, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/668,532

(22) Filed: May 20, 2024

(65) Prior Publication Data

US 2024/0305435 A1 Sep. 12, 2024

Related U.S. Application Data

(63) Continuation of application No. 17/270,043, filed as application No. PCT/EP2019/072143 on Aug. 19, 2019, now Pat. No. 11,991,119.

(51) Int. Cl.

| | |
|---|---|
| ***H04L 5/00*** | (2006.01) |
| ***H04W 28/18*** | (2009.01) |
| ***H04W 72/566*** | (2023.01) |

(52) U.S. Cl.

CPC .......... *H04L 5/0064* (2013.01); *H04L 5/0044* (2013.01); *H04L 5/0069* (2013.01); *H04W 28/18* (2013.01); *H04W 72/569* (2023.01)

(58) Field of Classification Search

CPC ... H04L 5/0064; H04L 5/0044; H04L 5/0069; H04L 5/0058; H04W 28/18; H04W 72/569

See application file for complete search history.

(56) References Cited

U.S. PATENT DOCUMENTS

| | | | | |
|---|---|---|---|---|
| 2015/0215430 | A1* | 7/2015 | Votour | H04L 45/00 709/220 |
| 2017/0230939 | A1* | 8/2017 | Rudolf | H04W 4/70 |

(Continued)

FOREIGN PATENT DOCUMENTS

| | | | |
|---|---|---|---|
| EP | 3277047 | A2 | 1/2018 |
| EP | 3301986 | A1 | 4/2018 |

(Continued)

OTHER PUBLICATIONS

AT&T GNS Belgium SPRL, "URLLC Scenarios and Enhancements for NR Rel16", 3GPP TSG RAN Meeting #80, Jun. 14, 2018, 7 pgs., La Jolla, CA.

(Continued)

*Primary Examiner* — Khoa Huynh

(74) *Attorney, Agent, or Firm* — XSENSUS, LLP

(57) ABSTRACT

A method for transmitting data by a communications device in a wireless communications network, the method comprising assigning one of a plurality of logical channel priorities to the data in accordance with a plurality of service types, the logical channel priorities providing at least an indication of high priority data and lower priority data, forming a transport block of the data for transmission at a medium access control protocol layer in accordance with the logical channel priorities, and passing the transport block from the medium access control protocol layer to a physical layer for transmission and providing an indication to the physical layer based on the logical channel priority of the data in the transport block.

19 Claims, 7 Drawing Sheets

(56) References Cited

U.S. PATENT DOCUMENTS

| | | | | |
|---|---|---|---|---|
| 2017/0257876 | A1* | 9/2017 | Loehr | H04L 5/0044 |
| 2018/0048577 | A1 | 2/2018 | Gulati et al. | |
| 2018/0205808 | A1 | 7/2018 | Yang et al. | |
| 2018/0227805 | A1 | 8/2018 | Jang | |
| 2019/0159236 | A1 | 5/2019 | Xu et al. | |
| 2019/0223196 | A1 | 7/2019 | Yu et al. | |
| 2019/0357235 | A1 | 11/2019 | Wang et al. | |
| 2020/0053761 | A1* | 2/2020 | Hosseini | H04W 72/56 |
| 2020/0059390 | A1 | 2/2020 | Zhang et al. | |
| 2021/0144623 | A1* | 5/2021 | Höglund | H04W 48/10 |

FOREIGN PATENT DOCUMENTS

| | | | | |
|---|---|---|---|---|
| GB | 2401760 | A * | 11/2004 | H04W 28/18 |
| IN | 201747013982 | A | 4/2017 | |
| JP | 2017-529759 | A | 10/2017 | |
| JP | 2019-527994 | A | 10/2019 | |
| KR | 20050118594 | A | 12/2005 | |
| KR | 20050119583 | A | 12/2005 | |
| KR | 20090090274 | A | 8/2009 | |
| KR | 20170057227 | A | 5/2017 | |
| KR | 20180032675 | A | 3/2018 | |
| WO | WO-2017003230 | A1 * | 1/2017 | H04W 76/27 |
| WO | WO-2017137231 | A1 | 8/2017 | |
| WO | 2018/028269 | A1 | 2/2018 | |
| WO | 2018/059335 | A1 | 4/2018 | |
| WO | 2018/130034 | A1 | 7/2018 | |
| WO | 2018/141952 | A1 | 8/2018 | |
| WO | WO-2018143869 | A1 | 8/2018 | |

OTHER PUBLICATIONS

Interdigital Inc., "LCH Selcetion in LCP based on Transmission Profiles", 3GPP TSG RAN WG2 #99 R2-1798728, Aug. 25, 2017, 7 pgs., Berlin, Germany.

Qualcomm Incorporated, "SRB1 PDCP Version change for UEs connecting to 5GCN through E Utran", 3GPP TSG RAN WG2 #100, R2-1712263, Dec. 1, 2017, 6pgs., Reno, Nevada.

International Search Report and Written Opinion mailed on Jan. 28, 2020, received for PCT Application PCT/EP2019/072143, Filed on Aug. 19, 2019, 18 pages.

3GPP, "NR; NR and NG-RAN Overall Description", TS 38.300 V15.2.0, Release 15, Jun. 2018, pp. 1-87.

Holma et al., "LTE for UMTS OFDMA and SC-FDMA Based Radio Access" Wiley and Sons, pp. 25-27, 2009.

3GPP, "Study on Scenarios and Requirements for Next Generation Access Technologies", TR 38.913 V14.3.0, Release 14, Jun. 2017, pp. 1-39.

3GPP TS 38.212 V15.2.0 (Jun. 2018) 3rd Generation Partnership Project; Technical Specification Group Radio Access Network: NR; Multiplexing and channel coding (Release 15), http://www.3gpp.org, p. 1-98.

3GPP TS 38.321 V15.3.0 (Sep. 2018) 3rd Generation Partnership Project: Technical Specification Group Radio Access Network: NR; Medium Access Control (MAC) protocol specification (Release 015), http://www.3gpp.org, p. 1-76.

3GPP TSG-RAN#80 RP-181479 La Jolla, US, Jun. 11-14, 2018, Source: Nokia, Nokia Shanghai Bell Title: New SID on NR Industrial IoT Document for: Approval, Agenda Item: 9.1.9.

3GPP TS 38.213 V15.2.0 (Jun. 2018), 3rd Generation Partnership Project: Technical Specification Group Radio Access Network: NR; Physical layer procedures for control (Release 15), http://www.3gpp.org, p. 1-99.

3GPP TS 36.331 V16.2.1 (Sep. 2020), 3rd Generation Partnership Project: Technical Specification Group Radio Access Network: Evolved Universal Terrestrial Radio Access (E-UTRA): Radio Resource Control (RRC): Protocol specification (Release 16), http://www.3gpp.org, p. 1-1081.

Huawei, HiSilicon, RRC Architecture and its Signalling Transmission[online], 3GPP TSG RAN WG2 #96 R2-167581 Internet<URL:http://www.3gpp.org/ftp/tsg_ran/WG2_RL2/TSGR2_96/Docs/R2-167581.zip>, Nov. 18, 2016.

3GPP 3rd Generation Partnership Project; Technical Specification Group Radio Access Network; NR; Physical layer procedures for data {Release 15), TS 38.214 V15.2.0 (Jun. 2018) pp. 1-95.

* cited by examiner

COMMUNICATIONS DEVICE, INFRASTRUCTURE EQUIPMENT AND METHODS

CROSS-REFERENCE TO RELATED APPLICATIONS

The present application is a continuation of U.S. application Ser. No. 17/270,043, filed Feb. 22, 2021, which is based on PCT filing PCT/EP2019/072143, filed Aug. 19, 2019, which claims priority to EP 18197373.6, filed Sep. 27, 2018, the entire contents of each are incorporated herein by reference.

BACKGROUND

Field

The present disclosure relates to communications devices, infrastructure equipment and methods for the transmission of data by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

Another example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of communications devices associated with different traffic profiles gives rise to new challenges for efficiently handling communications in wireless telecommunications systems that need to be addressed.

SUMMARY

The present disclosure can help address or mitigate at least some of the issues discussed above.

Embodiments of the present technique can provide a method for transmitting data by a communications device in a wireless communications network, the method comprising assigning one of a plurality of logical channel priorities to the data in accordance with a plurality of service types, the logical channel priorities providing at least an indication of high priority data and lower priority data, forming a transport block of the data for transmission at a medium access control protocol layer in accordance with the logical channel priorities, and passing the transport block from the medium access control protocol layer to a physical layer for transmission and providing an indication to the physical layer based on the logical channel priority of the data in the transport block.

Embodiments of the present technique can provide a method for transmitting data by a communications device in a wireless communications network which provides connectivity to destinations outside of the wireless communications network, the method comprising: determining that first data having a destination outside of the wireless communications network is available for uplink transmission, determining that second data, having a destination within the wireless communications network, is available for uplink transmission, forming a transport block, the transport block comprising the first data in preference to the second data, and transmitting signals representing the transport block.

Embodiments of the present technique therefore provide an arrangement in which data from one service type is prioritised for transmission in a transport block over another even when data from a lower priority service type can be transmitted within a transport block with the higher priority data. This arrangement provides an advantage in which the higher priority data is not delayed in transmission by including the lower priority data. Thus the transport block is transmitted irrespective of the amount of the higher priority data with respect to an available capacity of the transport block, which means that even if there is an available capacity for transmitting the lower priority data this is not included in the transport block with the higher priority data.

Embodiments of the present technique can provide an arrangement in which data for transmission from different service types is allocated a different logical channel priority (LCP), which is used to determine a priority with which transport blocks are filled. For example the medium access control layer of a protocol stack present in the communications device can assign the LCP and determine the priority with which the data from each service type is passed to a physical access layer.

Embodiments of the present technique, which further relate to communications devices, infrastructure equipment, methods of operating infrastructure equipment and circuitry for communications devices and infrastructure equipment, allow for efficient and timely transmission of high priority data.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
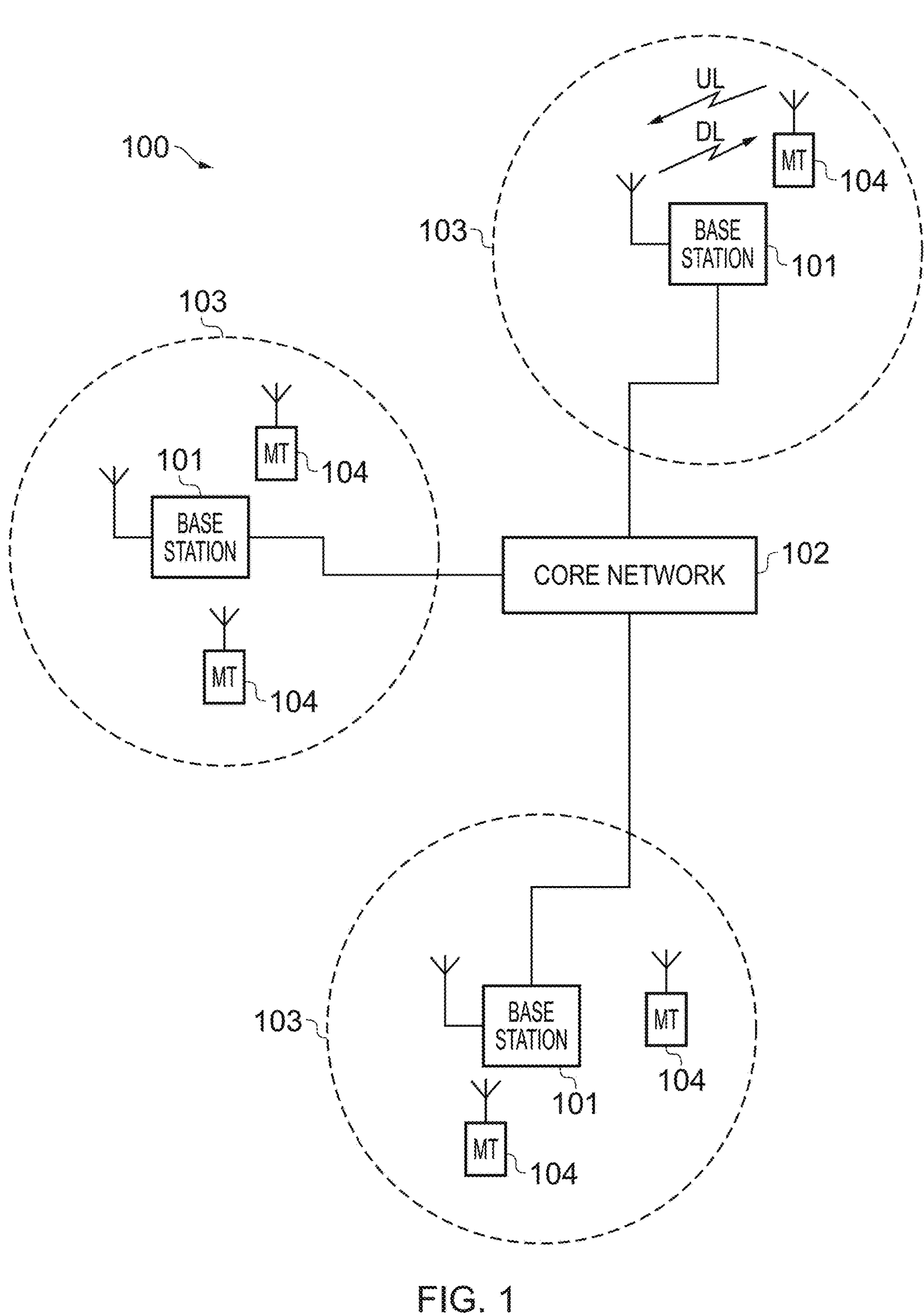
FIG. 1 schematically represents some aspects of a LTE-type wireless telecommunication system which may be configured to operate in accordance with example embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104, and within which a communications device may obtain service. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs and so forth. In this regard different terminology is often associated with different generations of wireless telecommunications systems for elements providing broadly comparable functionality. However, example embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

Figure 2:
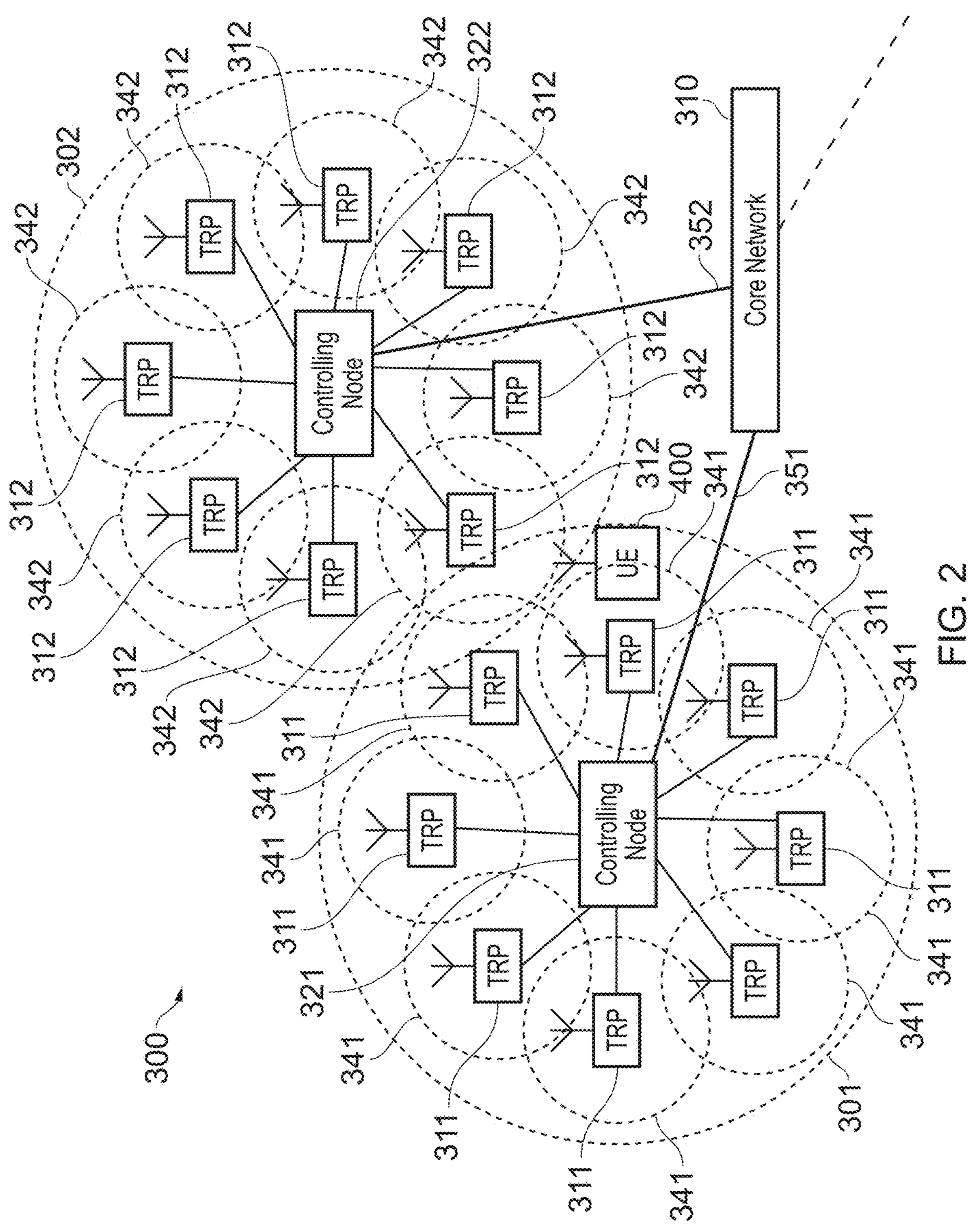
FIG. 2 schematically represents some example aspects of a new radio access technology (RAT) wireless communications network which may be configured to operate in accordance with embodiments of the present disclosure.

FIG. 2 is a schematic diagram illustrating a network architecture for a new RAT wireless communications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for communications devices connected to the network. Each distributed unit 311, 312 has a coverage area (radio access footprint) 341, 342 which together define the coverage of the respective communication cells 301, 302. Each distributed unit 311, 312 includes transceiver circuitry for transmission and reception of wireless signals and processor circuitry configured to control the respective distributed units 311, 312.

In terms of broad top-level functionality, the core network component 310 of the new RAT communications network represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device 400 is represented in FIG. 2 within the coverage area of the first communication cell 301. This communications device 400 may thus exchange signalling with the first controlling node 321 in the first communication cell via one of the distributed units 311 associated with the first communication cell 301. In some cases communications for a given communications device are routed through only one of the distributed units, but it will be appreciated in some other implementations communications associated with a given communications device may be routed through more than one distributed unit, for example in a data duplication scenario and other scenarios.

The particular distributed unit(s) through which a communications device is currently connected through to the associated controlling node may be referred to as active distributed units for the communications device. Thus the active subset of distributed units for a communications device may comprise one or more than one distributed unit (TRP). The controlling node 321 is responsible for determining which of the distributed units 311 spanning the first communication cell 301 is responsible for radio communications with the communications device 400 at any given time (i.e. which of the distributed units are currently active distributed units for the communications device). Typically this will be based on measurements of radio channel conditions between the communications device 400 and respective ones of the distributed units 311. In this regard, it will be appreciated that the subset of the distributed units in a cell which are currently active for a communications device will depend, at least in part, on the location of the communications device within the cell (since this contributes significantly to the radio channel conditions that exist between the communications device and respective ones of the distributed units).

In at least some implementations the involvement of the distributed units in routing communications from the communications device to a controlling node (controlling unit) is transparent to the communications device 400. That is to say, in some cases the communications device may not be aware of which distributed unit is responsible for routing communications between the communications device 400 and the controlling node 321 of the communication cell 301 in which the communications device is currently operating, or even if any distributed units 311 are connected to the controlling node 26 and involved in the routing of communications at all. In such cases, as far as the communications device is concerned, it simply transmits uplink data to the controlling node 321 and receives downlink data from the controlling node 26 and the communications device has no awareness of the involvement of the distributed units 311, though may be aware of radio configurations transmitted by distributed units 311. However, in other embodiments, a communications device may be aware of which distributed unit(s) are involved in its communications. Switching and scheduling of the one or more distributed units may be done at the network controlling node based on measurements by the distributed units of the communications device uplink signal or measurements taken by the communications device and reported to the controlling node via one or more distributed units.

In the example of FIG. 2, two communication cells 301, 302 and one communications device 400 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 321, 322 and/or a TRP 311, 312 of the kind shown in FIG. 2 which is adapted to provide functionality in accordance with the principles described herein.

The embodiments of the present invention can find application with advanced wireless communications systems such as those referred to as 5G or New Radio (NR) Access Technology.

The elements of the wireless access network shown in FIG. 1 may be equally applied to a 5G new RAT configuration, except that a change in terminology may be applied as mentioned above.

Figure 3:
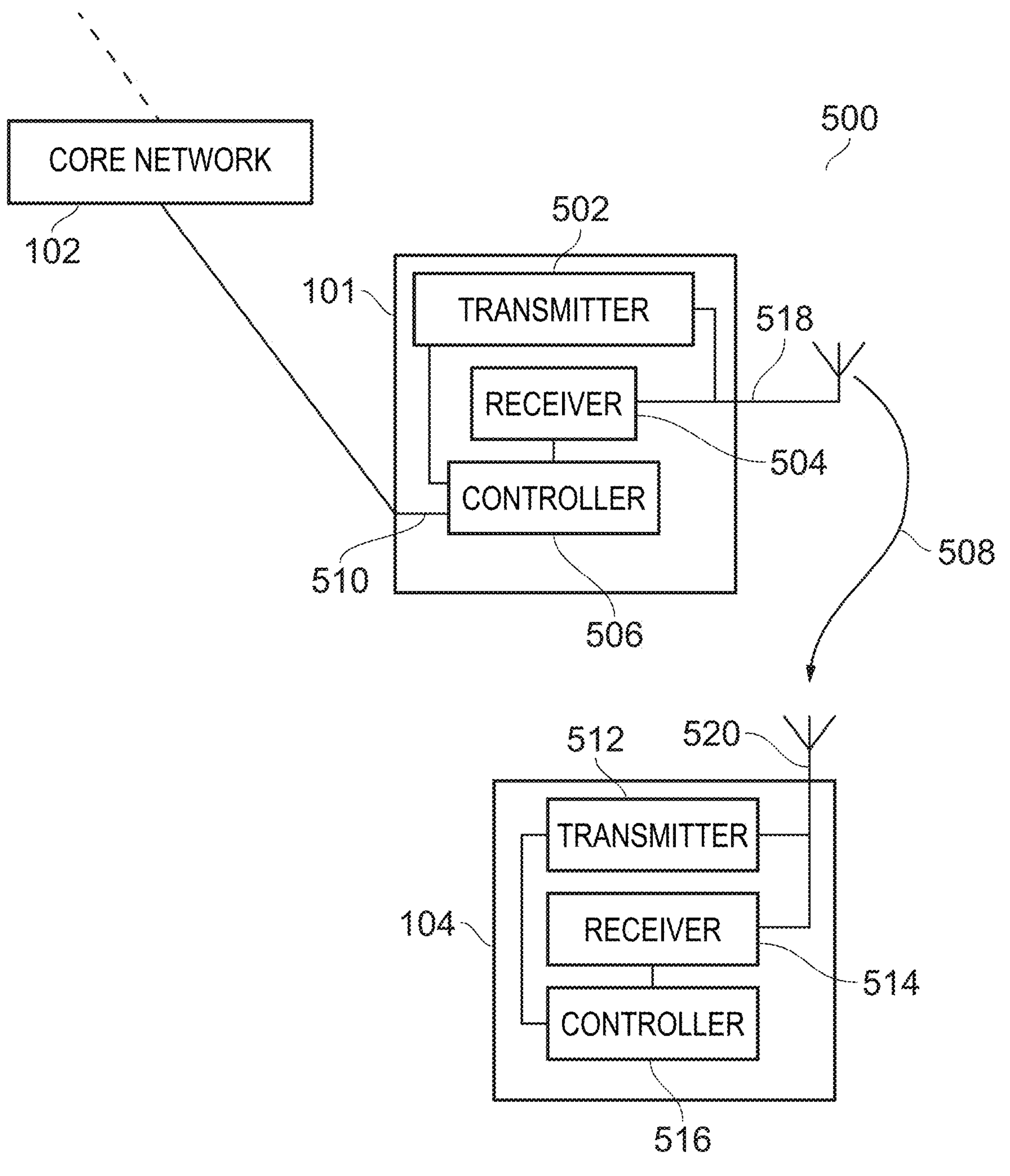
FIG. 3 schematically shows a telecommunications system according to an embodiment of the present disclosure.

FIG. 3 schematically shows a telecommunications system 500 according to an embodiment of the present disclosure. The telecommunications system 500 in this example is based broadly around an LTE-type architecture. As such many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current LTE-standards.

The telecommunications system 500 comprises a core network part 102 coupled to a radio network part. The radio network part comprises the infrastructure equipment (which may be an evolved-nodeB) 101 coupled, via a wireless access interface illustrated generally by arrow 508, to a communications device 104, which may also be referred to as terminal devices. It will of course be appreciated that in practice the radio network part may comprise a plurality of base stations serving a larger number of communications devices across various communication cells. However, only a single infrastructure equipment and single communications device are shown in FIG. 3 in the interests of simplicity.

As noted above, the operation of the various elements of the communications system 500 shown in FIG. 3 may be broadly conventional apart from where modified to provide functionality in accordance with embodiments of the present disclosure as discussed herein.

The infrastructure equipment 101 is connected to the core network 102 via an interface 510 to a controller 506. The infrastructure equipment 101 includes a receiver 504 connected to an antenna 518 and a transmitter 502 connected to the antenna 518. The receiver 504 and the transmitter 502 are both connected to the controller 506. The controller 506 is configured to control the infrastructure equipment 101 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 506 may comprise circuitry which is suitably configured/programmed to provide the desired functionality using conventional programming/configuration techniques for equipment in wireless telecommunications systems. The transmitter 502, receiver 504 and controller 506 are schematically shown in FIG. 3 as separate elements for case of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 101 will in general comprise various other elements associated with its operating functionality.

Correspondingly, the communications device 104 includes a controller 516 connected to a receiver 514 which receives signals from an antenna 520. The controller 516 is also connected to a transmitter 512 which is also connected to the antenna 520. The controller 516 is configured to control the communications device 104 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 516 may comprise circuitry which is suitably configured/programmed to provide the desired functionality using conventional programming/configuration techniques for equipment in wireless telecommunications systems. The transmitter 512, receiver 514 and controller 516 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 104 will in general comprise various other elements associated with its operating functionality, for example a power source, user interface, and so forth, but these are not shown in FIG. 3 in the interests of simplicity.

5G and URLLC

Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. The requirements for Ultra Reliable & Low Latency Communications (URLLC) [1] services are for a reliability of $1\text{-}10^5$ (99.999%) or higher for one transmission of a 32 byte packet with a user plane latency of 1 ms [3]. In some scenarios, there may be a requirement for a reliability of $1\text{-}10^6$ (99.9999%) or higher. Massive Machine Type Communications (mMTC) is another example of a service which may be supported by NR-based communications networks.

The inventors have appreciated that conventional techniques for the transmission of data may not be suitable to meet the requirements for the transmission of traffic associated with certain services, such as for example URLLC.

According to embodiments of the present disclosure, there is provided a method for transmitting data by a communications device in a wireless communications network, the method comprising assigning one of a plurality of logical channel priorities to the data in accordance with a plurality of service types, the logical channel priorities providing at least an indication of high priority data and lower priority data, forming a transport block of the data for transmission at a medium access control protocol layer in accordance with the logical channel priorities, and passing the transport block from the medium access control protocol layer to a physical layer for transmission and providing an indication to the physical layer based on the logical channel priority of the data in the transport block.

As a result the higher priority data may be transmitted appropriately by a physical layer and is not delayed in transmission and reliably delivered as a result of the presence of the lower priority data. This said indication to the physical layer can be an indication of the priority of the transport block, e.g. high priority and the physical layer knowing its priority would take the appropriate action to ensure the latency and reliability.

User Plane Vs. Control Plane (Hence SRB Vs. Non-SRB Traffic).

The transmission of data between a communications device and a wireless communications network may invoke one or more protocol entities at one or more respective protocol layers. Generally, each transmission of data using a protocol layer invokes two peer protocol entities, one operating in the sending device and one in the receiving entity; for example, in a wireless communications network, one entity may be in a communications device and one within an infrastructure equipment or core network equipment of the wireless communications network.

Protocol layers are generally arranged hierarchically such that a protocol entity at one layer may receive data for transmission from a protocol entity at a higher layer, and may pass data for transmission to a protocol entity at a lower layer. At the lowest layer, a physical layer (PHY) protocol entity controls the transmission of signals representing the data over a wireless access interface.

In a wireless communications network, protocols at the lowest protocol layers may be referred to as 'access stratum protocols'. For these protocols, the protocol entity in the communications device 104 has a peer protocol entity within the radio access network part of the wireless communications network, for example, in the infrastructure equipment 101. At higher layers, protocol entities in the communications device 104 may have respective peer protocol entities within the core network part of the wireless communications network; protocols at such layers may be referred to as non-access stratum (NAS) protocols.

The communications device may have other (higher layer) protocol entities whose peer entities are (logically, at least) outside of the wireless communications network, for example, at a corresponding entity (such as a web server, application server, or another communications device).

At any given protocol layer, data may be classified as 'control plane' or 'user plane'. Broadly speaking, control plane data for a protocol layer entity may be considered as data which is generated by that protocol entity, having as its destination the corresponding peer protocol entity in a different device. For example, RRC control plane data may be generated at an RRC protocol entity of a communications device for transmission to an RRC protocol entity in an infrastructure equipment.

On the other hand, with respect to a particular protocol entity, user plane data may be characterised as data which originated at (and thus is destined for) protocol entities at a higher protocol layer. As such, user plane data may have been received by the protocol entity from a protocol entity at a higher protocol layer for transmission, or received from a protocol entity at a lower protocol layer for processing and passing to a higher protocol layer.

Figure 4:
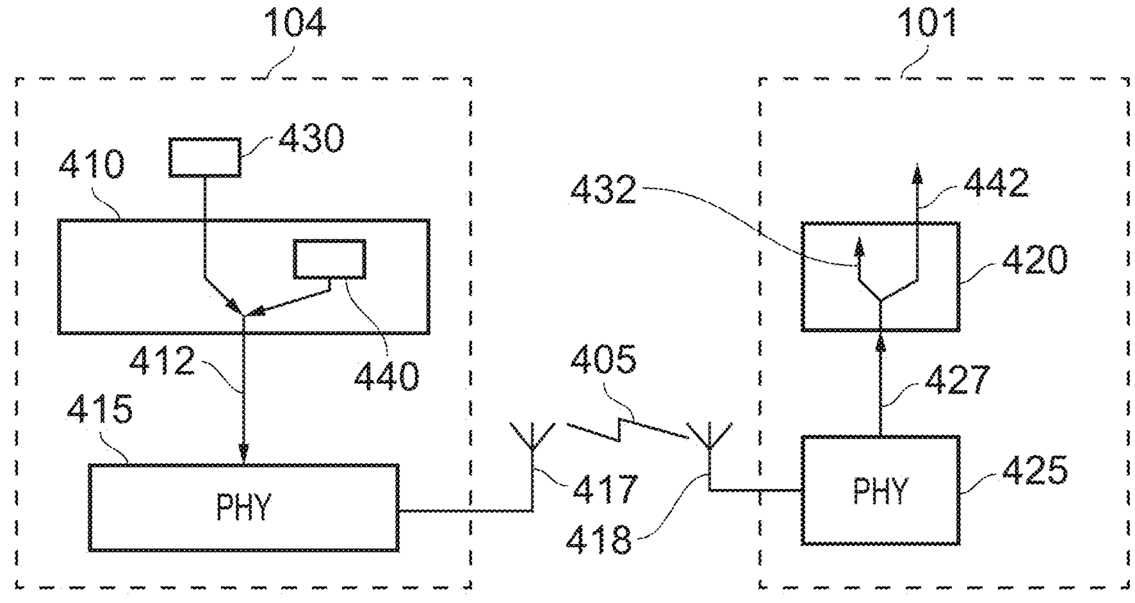
FIG. 4 illustrates an example of an arrangement of protocol layer entities within a communications device and an infrastructure equipment which may be configured in accordance with embodiments of the present technique.

FIG. 4 illustrates an example of an arrangement of protocol layer entities within the communications device 104 and the infrastructure equipment 101 which may be configured in accordance with embodiments of the present technique.

In the example of FIG. 4, protocol entities 410 and 420 are corresponding protocol entities at the same protocol layer, in the communications device 104 and the infrastructure equipment 101 respectively. With respect to the protocol entity 410, the data 430 which is received from a higher layer protocol entity (not shown) at the protocol entity 410 in the communications device 104 for transmission may be considered as user plane data. The protocol entity 410 may process the user plane data 430 in some manner (e.g. by segmentation, encoding, forming into protocol data units, associating with sequence numbers, etc.) before passing it to lower layers for transmission.

In contrast, control plane data 440 is generated by the protocol entity 410 in the communications device 104 for transmission to the peer protocol entity 420 of the infrastructure equipment. The protocol entity 410 may process the control plane data in a manner similar to that used for user plane data, before either passing it to lower layers for any further processing and transmission.

FIG. 4 shows physical layer (PHY) protocol entities 415, 425 in the communications device 104 and infrastructure equipment 101 respectively. The PHY protocol entities 415, 425 may be at the lowest level of the protocol hierarchy and may generate signals representing the data for transmission on the wireless access interface 405 and may decode signals representing the data received on the wireless access interface 405. The signals representing the data may be transmitted and received via one or more antennae 417,418.

At the communications device 104, both the control plane data 440 and the user plane data 430 are passed to the lower layers, and ultimately to physical layer (PHY) protocol entities 415, 425. When the control plane data 440 and the user plane data 430 are passed to the lower layers by the protocol entity 410, there may be no distinction between them; in other words, the receiving PHY layer entity may not be made aware of the distinction between data which, with respect to the protocol entity 410, is control plane data or user plane data, as indicated by the single arrow 412 from the protocol entity 410 to the lower layer protocol entity.

At the infrastructure equipment 104, the protocol entity 420 which is the peer entity of the protocol entity 410 receives the control plane data 440 and the user plane data 430 from a protocol entity at a lower layer.

As in the communications device 104, protocol layers below the peer protocol entity 420 may not be able to distinguish data which, with respect to the peer protocol entity 420, is control plane data 440 and which is user plane data 440. Both may be passed by the PHY protocol entity 425 to higher layers and ultimately to the peer protocol entity 420.

At the peer protocol entity 420, it is determined that the control plane data 440 is destined for the protocol entity 420, and is therefore processed in accordance with the protocol rules by which the protocol entities 410 and 420 operate, without being passed to higher layer protocol entities, as indicated by the arrow 432. The user plane data 430 is determined to be destined for a higher layer protocol entity, and is therefore processed in accordance with the protocol rules by which the protocol entities 410 and 420 operate in respect of user plane data; for example, this may involve performing decoding, reassembly, and/or generating acknowledgement information, before being passed to higher layer protocol entities, as indicated by the arrow 442.

In the example of FIG. 4, the protocol entity 420 which is the peer of the protocol entity 410 of the communications device 104 is shown as being within the infrastructure equipment 101. However, as described above, some protocol layers may be terminated (that is, have the peer entity corresponding to the protocol entity of the communications device 104) at other equipment within, or outside of, the wireless communications network.

Grant Based and Grant Free Resources

In a conventional uplink transmission, when data arrives from upper protocol layers at a buffer at the medium access control (MAC) protocol layer of the communications device, the communications device may transmit, in response, a Scheduling Request (SR) to the network if the communications device has no uplink transmission/resources scheduled. The communications device may transmit a buffer status report (BSR), indicating an amount of data in the MAC layer buffer(s). In response to receiving the SR or BSR, the network (for example, the infrastructure equipment) may send an Uplink Grant carried by downlink control information (DCI) to the communications device. The DCI may be transmitted on a physical downlink control channel (PDCCH).

The Uplink Grant may comprise an indication of uplink communications resources which are allocated (or, in other words, scheduled) for the communications device to transmit its uplink data. The uplink communications resources may be on a physical uplink shared channel (PUSCH). This type of resource allocation is known as grant based resource. Grant based resources are suitable for services where the data arrives in variable amounts, and/or is aperiodic, even if such the data traffic arrival follows a somewhat predictable traffic pattern.

On the other hand, grant free resources are a set of periodically repeating uplink communications resources which are semi-statically configured by the network for the use of the communications device for uplink transmission. Grant free resource allocation is particularly suitable for services that generate periodic data traffic, where the amount generated is broadly constant over time.

The grant free resources can improve the efficiency with which communications resources are used, since there is no need for either a SR or uplink grant to be transmitted in respect of each uplink data transmission.

Logical Channels

At a MAC protocol entity, data which is received for transmission may be associated with a radio bearer which is either a signalling radio bearer (SRB) or a data radio bearer (DRB). Each radio bearer is associated (either by default, or as a result of specific configuration by the network) with a logical channel, and hence with a logical channel priority. For example, RRC control plane data (that is, data generated by an RRC protocol entity) may be associated with a first SRB 'SRB1' and/or a third SRB 'SRB3' which, conventionally, may be associated with a logical channel or logical channels having a highest priority.

NAS signalling (that is, data which is control plane data with respect to a NAS protocol entity) may be associated with a second SRB 'SRB2', which conventionally may be associated with a logical channel not having the highest priority.

Other user plane data received at a Packet Data Convergence Protocol (PDCP) protocol entity from higher layers other than RRC control plane data (including NAS signalling) may conventionally be assigned to one of one or more data radio bearers which are associated with one or more logical channels having a priority lower than that associated with the logical channels used for data associated with either SRB1 or SRB3.

MAC Transport Block

Data may be transmitted by the communications device 104 using uplink communications resources using MAC transport blocks (TB). Each MAC TB is constructed at the MAC protocol layer in response to determining that uplink communications resources are, or will be, scheduled for the communications device and that data is available for uplink transmission.

Conventionally, a MAC TB is formed using 'highest priority first' scheduling. That is, data associated with logical channels having the highest priority is added to the MAC TB in preference to data associated with logical channels having lower priorities. In order to provide some fairness in the scheduling, each logical channel may be associated with 'bucket' parameters, according to which a form of leaky bucket scheduling is applied. That is, each logical channel may be subject to maximum throughput constraints, which may permit a high throughput over a short period of time, while limiting a long-term throughput; alternatively, the throughput constraints may limit throughput over a short term while allowing high throughput over a longer time period.

One or more logical channels (in particular, those associated with signalling radio bearers) may be associated with leaky bucket parameters which have the effect of not limiting in any way the short- or long-term throughput which is permitted for that logical channel.

According to embodiments of the present disclosure, URLLC data may be included in a MAC TB in preference to other data, irrespective of whether the other data includes one or more of an RRC control signalling message and a NAS signalling message.

Figure 5:
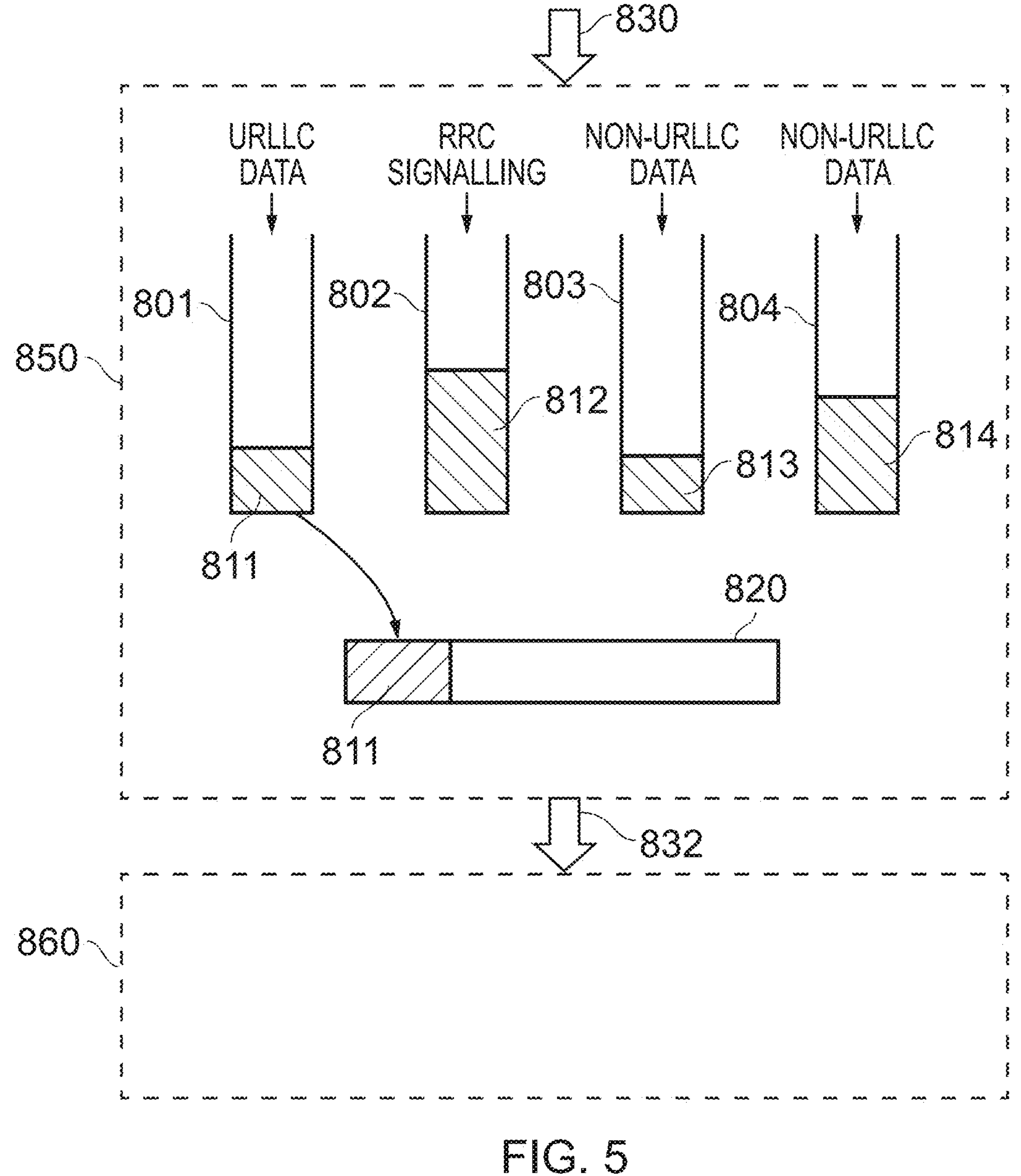
FIG. 5 illustrates a formation of a medium access control (MAC) transport block in accordance with embodiments of the present disclosure.

FIG. 5 illustrates a formation of a MAC TB in accordance with embodiments of the present disclosure.

In the example of FIG. 5, within the MAC protocol entity 850 are four buffers 801, 802, 803, 804 each associated with one of four logical channel priorities LCP1-4. LCP1>LCP2>LCP3>LCP4, where 'X>Y' denotes that X has a higher priority than Y.

Data received from higher layers (e.g. via the interface 830) may be assigned to, or associated with, a logical channel (LC) in accordance with a predetermined mapping, which may be based on an association between the data and a radio bearer. Each of the plurality of logical channels is associated with a logical channel priority (LCP) value. Each LC may be associated with a logical channel identifier, LCID.

In the example of FIG. 5, URLLC data 811 is associated with a first DRB, DRB1, and with a logical channel having an LCID of 7. The logical channel with LCID=7 is associated with an LCP value of 4, which represents the highest priority of any LCP value. Arriving URLLC data 811 is thus buffered in the first buffer 801. In some embodiments, an LC associated with a low LCP value has a higher priority than an LC associated with a higher LCP value, with the exception of an LC associated with LCP value 4, which has the highest priority of any LC.

Accordingly, other data 812, 813, 814 may be associated with SRB/DRBs, and hence with other LCs and LCPs, as indicated in Table 1 below.

TABLE 1

| Data type | SRB/DRB | LCID | LCP value |
|---|---|---|---|
| URLLC | DRB1 | 7 | 4 |
| RRC signalling | SRB1 | 1 | 1 |
| NAS signalling | SRB2 | 2 | 3 |
| Non-URLLC data A | DRB2 | 4 | 5 |
| Non-URLLC data B | DRB3 | 5 | 6 |

As shown in Table 1, data 812 generated by an RRC protocol entity may be associated with a signalling radio bearer, for example, SRB1 or SRB3. URLLC data 811 and non-URLLC data 813, 814, may be associated with one of 3 data radio bearers, DRB1 to DRB3.

According to embodiments of the present technique the URLLC data 811 is associated with the highest priority logical channel and is stored in the buffer 801 associated with the highest priority.

The RRC signalling 812 may be associated with the second highest priority and stored in the buffer 802, while the non-URLLC data 813 associated with DRB2 and the non-URLLC data 814 associated with DRB3 may be stored in the third and fourth buffers 803, 804, respectively.

In some embodiments, one or more of packet data convergence protocol signalling messages, medium access control signalling messages and radio link control (RLC) signalling messages may be associated with a priority which is lower than the highest priority.

Thus, in accordance with embodiments of the present disclosure, data other than RRC signalling and NAS signalling may be assigned to the highest LCP. In particular, data, such as URLLC data, which is associated with a low latency requirement and/or a high reliability requirement may be assigned to an LCP which is of higher priority than LCPs to which RRC signalling and NAS signalling are assigned.

It will be appreciated that the actual values of the LCP value and LC ID may be modified without departing from the scope of the present disclosure. The values indicated above may avoid modifying the LC ID or LCP values associated with data which is conventionally associated with an SRB, and may permit conventional values (other than an LCP value of 4) to be used for other (non-SRB data) when no URLLC data is to be transmitted (for example, in communications devices which do not support the URLLC service or URLLC service has been released but other services remain active). In such embodiments, signalling which refers to conventional LCP values (for example, to indicate default parameters to be used for SRB data) need not be adapted.

In other embodiments, the LCP value associated with the LC used for URLLC is set to 1, and LCP values associated with LCs used for SRBs are accordingly modified such that LCP values correspond directly to a priority level. Such embodiments may thus provide a direct correspondence between an LCP value and a relative priority. In some such embodiments, indications of parameters associated with LCs and LCP values may be adapted accordingly based on whether or not URLLC data is to be transmitted. For example, when a DRB is established for the purposes of transmitting URLLC data and the URLLC data is to be associated with an LCP value of 1, the infrastructure equipment 101 may transmit an indication to modify the LCP value(s) associated with LCs associated with one or more SRBs.

As such, when forming a MAC TB 820, the MAC protocol entity 850 may include with highest priority the URLLC data 811.

The MAC TB 820 may be formed in response to determining that uplink communication resources have been reserved or allocated for the transmission of uplink data by the communications device 104.

In some embodiments of the present technique if, having included all of the URLLC data 811, there remains space in the MAC TB 820 for further data, then additional data is drawn from the buffers 802, 803, 804 in decreasing priority order until the MAC TB 820 is full.

The size of the MAC TB may be determined in accordance with a transport block size (TBS) which may be associated with the uplink communications resources which are allocated to the transmission of the MAC TB. For example, the TBS may be indicated in the downlink transmission in which the allocated uplink communications resources were indicated by the infrastructure equipment 101 to the communications device 104.

In some embodiments of the present technique, once some or all of the URLLC data 811 has been added to the MAC TB 820 then, as shown in FIG. 5, instead of adding data from the lower priority buffers 802, 803, 804, the MAC protocol entity 850 refrains from adding any other lower priority data to the MAC TB 820.

The MAC TB 820 may be passed to the physical layer (PHY) protocol entity 860 via the interface 832 for uplink transmission using the allocated communications resources.

In some embodiments the TBS of the MAC TB 820 is set in accordance with the TBS associated with the uplink grant. The PHY protocol entity 860 may determine the TBS the determined TBS value to the MAC protocol entity 850. In some embodiments, the determined TBS may be modified by the MAC protocol entity 850. Thus, for example, when the URLLC data 811 does not fully occupy the MAC TB 820 the MAC entity 850 may reduce the TBS in order to improve the reliability with which the MAC TB 820 is transmitted over the wireless access interface, for example, by reducing the code rate.

The reduced TBS value may be indicated by the MAC protocol entity 850 to the PHY protocol entity 860.

When the PHY protocol entity 860 generates the signals for transmission over the wireless access interface representing the MAC TB 820, encoding using rate matching based on the allocated uplink resources may be carried out. If the TBS has been reduced, then the resulting encoding may provide improved reliability compared with the encoding that would have resulted based on the original (larger) TBS.

In some embodiments the TBS of the MAC TB 820 may be selected from a plurality of permitted TBS values in accordance with predetermined rules. For example the uplink grant may be associated with two or more predetermined TBS values, and the MAC protocol entity 850 may select the most appropriate of the permitted TBS values for use in forming the MAC TB 820. For example the MAC protocol entity 850 may select the lowest TBS value of the permitted TBS values which permits all of the URLLC data 811 which is currently available for transmission to be transmitted within the MAC TB 820.

In some embodiments of the present technique the PHY protocol entity 860 indicates to the MAC protocol entity 850 a plurality of permitted the TBS values which may be selected by the MAC protocol entity 850. In some embodiments the set of permitted TBS values may be implicitly indicated in the DCI, where a TBS indicated by the DCI represents a maximum TBS value. Alternatively the set of permitted TBS values may be explicitly signalled in the DCI. In some embodiments the permitted TBS values are indicated in a manner similar to that used for early data transmission (EDT) using message 3 in the 3GPP Release 15 efe-MTC.

In some embodiments at least two tables are preconfigured in the communications device 104 and the infrastructure equipment 101, for example in accordance with standards specifications. Preferably each table indicates, for each of a plurality of row index numbers, either the corresponding TBS value, or modulation and coding scheme parameters by which the TBS value may be determined. A row number from one table may be indicated by the uplink grant or in the DCI, and the MAC protocol entity 850 may be permitted to select a TBS value from a different preconfigured table having the same indicated row number. When receiving the MAC TB, the infrastructure equipment 101 will perform blind decoding based on two or more of the possible TBS values, to determine which of the permitted TBS values has been used to form the MAC TB.

In some embodiments, the MAC protocol entity 850 is configured with two tables of coding parameters, one for low reliability and another for high reliability. Each table may provide parameters which permit a TBS value to be determined for each row of the table. The low reliability parameters may be appropriate for the eMBB service, for example. When the infrastructure equipment 101 sends the uplink grant or DCI to the communications device 104, a table row number may be indicated for the low reliability coding parameters table.

When the communications device 104 receives the grant, it determines that there is high reliability data (e.g. URLLC data) in the buffer and, based on this determination, selects a TBS value corresponding to the coding parameters indicated in the high reliability table, using the same table row number as indicated in the grant or DCI.

Because the infrastructure equipment 101 may not be aware of whether the communications device 104 has high priority data to transmit, and therefore whether the communications device 104 has used the parameters from the low reliability table or from the high reliability table, the infrastructure equipment 101 is configured to decode the received MAC TB in accordance with both possible TBS values.

For example, the tables may comprise the tables defined for a physical uplink shared channel (PUSCH) as specified in 3GPP TS 38.214 [4], and the row number may be indicated by an MCS Index (IMCS) parameter. The tables may indicate, for each MCS Index, a modulation order and target code rate. Based on the modulation order, target code rate and determined allocated uplink communications resources, the corresponding TBS value may be determined.

Once the MAC TB 820 has been passed to the PHY protocol entity 860 then the PHY protocol entity 860 transmits on the wireless access interface signals representing the MAC TB 820 using the uplink communications resources allocated for the uplink transmission. As described above these communications resources may be allocated explicitly by means of an uplink grant or may be allocated by means of RRC configuration using a grant free resource.

The infrastructure equipment 101 receives at its physical layer entity the signals corresponding to the MAC TB 820 and these are decoded and passed to the MAC protocol entity of the infrastructure equipment 101. In embodiments where the MAC protocol entity 850 of the communications device 104 is permitted to select from a plurality of permitted TBS values then the infrastructure equipment 101 may determine the selected TBS value by performing blind decoding of the received signals.

Figure 6:
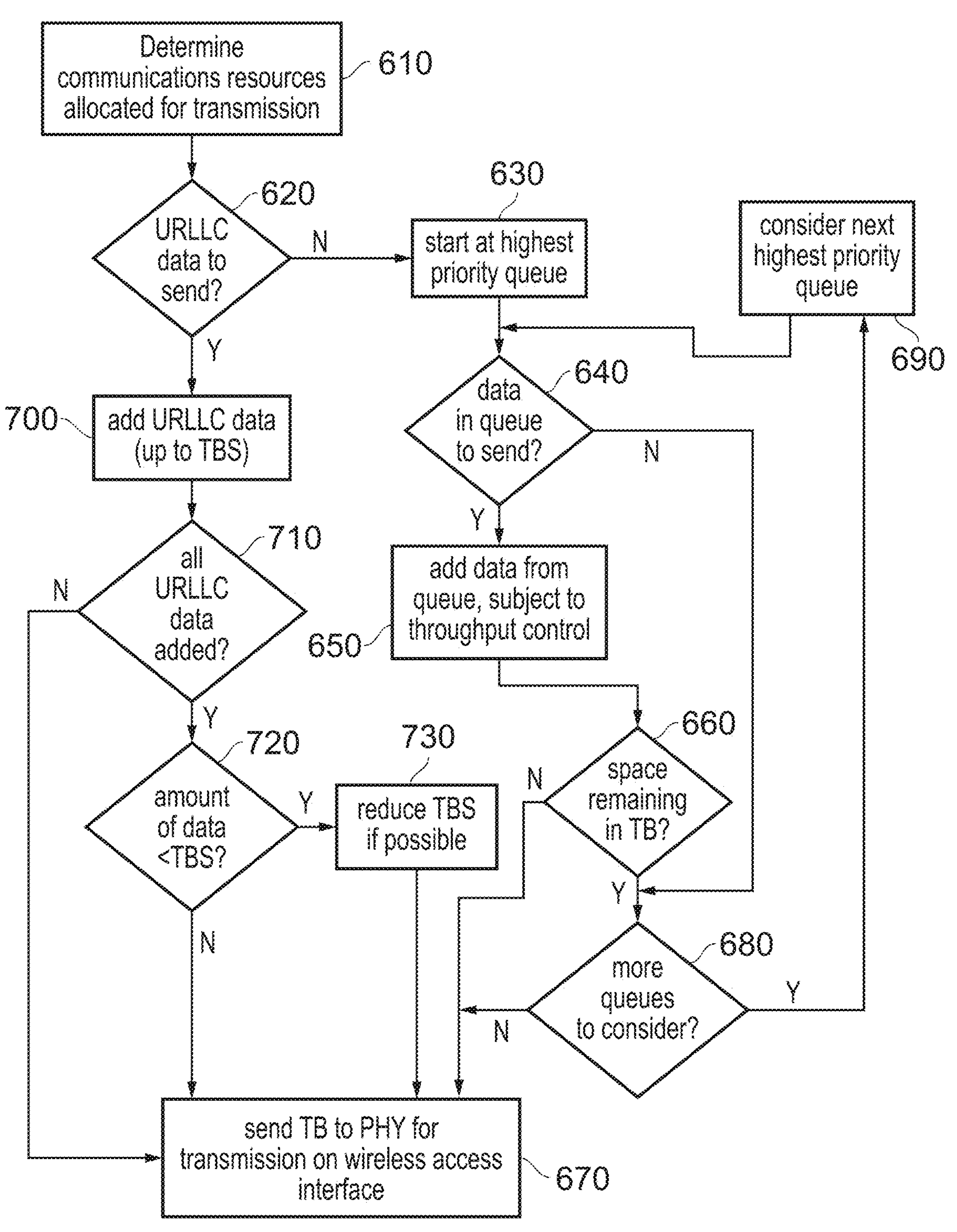
FIG. 6 illustrates a process which may be carried out by a MAC protocol entity in accordance with embodiments of the present technique.

FIG. 6 illustrates a process which may be carried out by a MAC protocol entity such as the MAC protocol entity 850 in accordance with embodiments of the present technique.

The process starts at step 610 in which the MAC protocol entity 850 determines that uplink communications resources have been allocated for the transmission of data and optionally determines a MAC TBS associated with the communications resources.

In some embodiments, the communications device 101 may, in step 610, determine that no grant free communications resources are allocated to the communications device 101, or that any such grant free communications resources are unsuitable (e.g. would result in an excessive latency for the transmission of the data). The communications device 101, in response to the determination, may transmit a scheduling request (SR/BSR) to the infrastructure equipment to request an allocation of communications resources.

If the communications device 101 determines that URLLC data, such as the URLLC data 811 is available for transmission, then it may indicate this in the SR/BSR.

In response to receiving an SR/BSR indicating that URLLC data is available to be sent, the infrastructure equipment 101 may transmit an indication of communications resources. The indication of communications resources may comprise an indication of a plurality of TBS values which the MAC protocol entity 850 may select, as described above.

In some embodiments, logical channels may be associated with a bandwidth part sub-carrier spacing requirement, where a bandwidth part comprises a range of carrier frequencies that is smaller than the system bandwidth of the wireless communications network, and where a plurality of bandwidth parts may be configured for a communications device. That is, a logical channel may be associated with a requirement that transmission of data associated with that logical channel is permitted only using a bandwidth part which is configured for a particular sub-carrier spacing.

According to some embodiments of the present technique, the selected communications resources are those having a sub-carrier spacing consistent with the requirements for the logical channel with which the highest priority data (e.g. the URLLC data 811) is associated.

In some embodiments, where the communications device 101 is operating in a multi-carrier and/or dual/multi-connectivity configuration, any requirement for a specific carrier or cell associated with the URLLC data 811 may take precedence, such that the determined communications resources are those which comply with the requirements associated with the URLLC data 811 and/or the logical channel to which it is associated, irrespective of any requirements associated with other data or other logical channels.

Control passes to step 620 in which it is determined whether there is any URLLC data to be sent, such as the URLLC data 811 which may be stored in the first buffer 801. If there is not, then control passes to step 630 where the MAC protocol entity selects the highest priority queue for processing.

From step 630, control passes to step 640 at which it is determined whether or not there is data in that queue available to be sent. If so, then control passes to step 650 and data from that queue is added to the MAC TB 820. In some embodiments the data may be added subject to an assessment as to whether bucket parameters associated with the data are satisfied. In other words, the communications device 104 may determine if an amount of data associated with that queue or with the logical channel which has recently been transmitted has been of such a rate such that only a limited amount or no additional data is permitted to be sent in the present MAC TB 820, and may add the data in accordance with the determination.

After step 650, control passes to step 660 in which it is determined whether there is any space left remaining in the MAC TB 820. If not, then control passes to step 670 in which the MAC protocol entity 850 passes the formed MAC TB 820 to the PHY protocol entity 860 for transmission on the wireless access interface and the process terminates.

If at step 660 it is determined that more space is available in the MAC TB 820 then control passes to step 680. In step 680 it is determined whether there are more queues to consider. If there are not then control passes to step 670 as described above.

If there are one or more queues still to be processed then in some embodiments control passes to step 690 as shown in FIG. 6, at which the next queue having the highest priority of those which have not already been considered is selected, and control then continues to step 640.

In some embodiments, if at step 680 it is determined that one or more queues remain to be considered then (not shown on FIG. 6) control returns to step 620 where it is determined first whether any URLLC is available for transmission. This allows for regular checking for URLLC data and ensures that URLLC/high priority data can be sent with highest priority even if the URLLC data arrives during the formation of a MAC TB.

If, at step 640, there is no data in the queue under consideration for transmission then control passes directly to step 680.

Returning to step 620, if it is determined that the URLLC data 811 is available to be sent then control passes to step 700 in which an amount of the URLLC data 811 up to the determined TBS is added to the MAC TB 820. Control then passes to step 710

In step 710 it is determined whether or not all of the URLLC data 811 which is available for transmission has been added to the MAC TB 820. If not, and the MAC TB 820 has been filled to the extent permitted in accordance with the determined TBS, then control passes to step 670 and the MAC TB 820 is passed to the PHY protocol entity 860 for transmission.

In step 710, if it is determined that all of the URLLC data 811 which is available for transmission has been added to the MAC TB 820 then control passes to step 720. In step 720 it is determined whether there is still space remaining in the MAC TB 820. In other words, it is determined whether or not the amount of data which has been included is less than the determined TBS. If the MAC TB 820 contains an amount of data corresponding to the determined TBS, then control passes to step 670.

If the amount of data is less than the determined TBS then control passes from step 720 to step 730. In some embodiments of the present technique then in step 730 the MAC protocol entity 850 may, apply one or more techniques to the MAC TB 820 having the effect of improving the reliability of the transmission of the MAC TB 820 to a peer MAC protocol entity, which may be within the infrastructure equipment 101.

For example, in some embodiments, the TBS of the MAC TB 820 is reduced, and the modified TBS is notified to the PHY protocol entity 860. Based on the communications resources determined in step 610 and the modified TBS, the PHY protocol entity 860 may thus encode the MAC TB 820 using a more robust encoding technique, for example by using a more robust modulation and coding scheme than would have been used for the originally determined TBS.

The reduced TBS may be selected in accordance with the principles which have been described above.

In some embodiments, the MAC protocol entity 850 may additionally or alternatively add redundant information to the MAC TB in order that the peer MAC protocol entity may detect and recover any errors arising from the transmission of the MAC TB 820 via the wireless access interface. Additionally or alternatively, the MAC protocol entity 850 may add padding bits to the MAC TB 820 such that the total amount of URLLC data plus padding bits corresponds to the selected TBS.

Reducing the TBS of the MAC TB 820 may permit further redundancy and/or more resilient encoding to be applied to the MAC TB to improve the reliability of the transmission on the wireless access interface.

The process flow described above is illustrative and it will be appreciated that the steps may be performed in a different order from that shown and described and/or one or more steps may be omitted. For example step 730 may be omitted in some embodiments and control may pass directly from step 700 to step 670 without performing the evaluations described at step 710 or step 720.

As described above, in some embodiments, the URLLC data 811 may not be subject to leaky bucket scheduling restrictions; as such, step 650 may not be applicable in respect of the URLLC data 811. In some embodiments, this may be realised by nominally applying the leaky bucket algorithm to the URLLC data 811 wherein one or more parameters for the leaky bucket scheduling algorithm are set so that no restriction in the permitted data rate for URLLC data results from the application of the algorithm. For example, a time period between successive replenishment of the bucket (which may be referred to as a bucket size duration parameter) may be set to zero. Alternatively or additionally, the quantity by which the bucket is 'topped up' after each such time period may be set to infinity.

These parameters may be pre-configured as default values associated with URLLC data and/or may be configured explicitly by means of RRC configuration.

Conventionally, the PHY protocol entity 860 may operate on a 'first in first out' (FIFO) approach, such that a MAC TB received from the MAC protocol entity 850 will be transmitted using determined uplink resources, and no subsequently received MAC TB will be transmitted using those resources.

According to embodiments of the present technique, a pre-emption feature is provided for URLLC transmission. That is, the URLLC transmission can be scheduled to occupy a subset of the resource that has already been scheduled previous to another transmission, e.g. eMBB. The pre-emption can be between different UEs, i.e. inter-UE pre-emption or a pre-emption can occur within the same UE, i.e. intra-UE pre-emption. If UE has already prepared MAC TB based Logical Channel priority and continued transmitting the TB (e.g. eMBB service), another higher prioritized LCP service (e.g. URLLC service) came in to force, then UE has to prepare the MAC TB and transmit it in the same slot this is known as "intra-UE pre-emption".

In some embodiments, the MAC records/registers that the ongoing TB (i.e. URLLC service) cannot be pre-empted because it has already the highest LCP. That is if the TB contains data from this new URLLC LCP, then this TB is recorded as un-pre-emptable. TB not containing data from URLLC LCP can therefore be pre-empted at the physical layer.

In some embodiments, the MAC provides an indication to physical layer (L1) that a TB (i.e. URLLC service) cannot be pre-empted because it has already the highest LCP. That is the MAC tells the physical layer whether a TB can be pre-empted, where a TB is not pre-emptable if it contains data from the new URLLC LCP.

In another embodiment, the MAC indicates to the physical layer (L1) whether the MAC TB can pre-empt another ongoing TB. Here if a MAC TB contains data from the new URLLC LCP, then the MAC can indicate to the physical layer that this MAC TB can pre-empt another MAC TB. NOTE: this indicates whether a TB can pre-empt another TB whereas the previously-described indication tells the physical layer whether a TB can be pre-empted. In some embodiments, a later URLLC transmission can pre-empt a previous URLLC transmission.

Referring again to FIG. 5, the PHY protocol entity 860 may be configured to pre-empt an ongoing transmission, based on, for example, priorities and/or pre-emption permissions or indications associated with one or both of the ongoing transmission and with the later-received MAC TB.

For example, the MAC protocol entity 850 may pass a MAC TB which does not contain any URLLC data to the PHY protocol entity 860 together with an indication that the MAC TB may be pre-empted during its transmission.

Subsequently, the MAC protocol entity 850 may pass a second MAC TB to the PHY protocol entity 860. If the second MAC TB comprises URLLC data, then the MAC protocol entity may indicate that the second MAC TB may pre-empt an ongoing transmission, if that ongoing transmission may be pre-empted.

In response to receiving the second MAC TB, the PHY protocol entity 860 may determine whether a) both of the conditions i) that the second MAC TB is indicated as being able to pre-empt an ongoing transmission, and/or whether ii) it was indicated that the MAC TB whose transmission is ongoing could be pre-empted. In some embodiments, if both of these conditions are satisfied, then the PHY protocol entity 860 may determine that pre-emption is permitted.

In some embodiments, the PHY protocol entity 860 may determine only whether one of the conditions are satisfied and that if that condition is satisfied, may determine that pre-emption is permitted.

If the PHY protocol entity 860 determines that pre-emption is permitted, it may then determine whether, of the uplink communications resources being used for the transmission of signals representing the first MAC TB, there remain sufficient allocated uplink resources for the transmission of signals representing the second MAC TB to be completed.

If these conditions are met, then the PHY protocol entity 860 may terminate the ongoing transmission of signals associated with the first MAC TB, and initiate, using the communications resources which were to have been used for the remainder of the signals associated with the first MAC TB, a transmission of signals representing the second MAC TB.

Thus, in some embodiments, the MAC layer entity 850 indicates to the PHY protocol entity 860 whether a MAC TB should, if possible, pre-empt an ongoing transmission. In some such embodiments, the MAC layer entity 850 may indicate to the PHY protocol entity 860 that a MAC TB should, if possible, pre-empt an ongoing transmission if that MAC TB comprises data associated with a highest priority or with a particular logical channel, and/or if the MAC TB contains URLLC data.

In some embodiments, one or both of an indication that a MAC TB should or may pre-empt an ongoing transmission and an indication that a MAC TB may not be pre-empted in its transmission, determined as described above, may be included in a header of the MAC TB and thus transmitted, as part of the MAC TB, to the infrastructure equipment 101.

Thus, in some embodiments, a TB from the highest priority LCP (URLLC) can pre-empt others, in some embodiments, a TB from the highest priority LCP (URLLC) cannot be pre-empted, and in some embodiments, both possibilities may be provided. These two features may thus be provided independently or together as described in this paragraph. In embodiments where a TB from the highest priority LCP (URLLC) can pre-empt others, but where there is no provision to prevent a TB from the highest priority LCP (URLLC) from itself being pre-empted, then a URLLC TB can pre-empt another URLLC TB.

In some embodiments, the MAC layer indicates to the physical layer whether a TB can be pre-empted, without the need for the MAC layer to know whether there is an on-going transmission. Based on such indication, the physical layer decides whether to pre-empt or not to pre-empt.

In some embodiments, the MAC layer decides whether pre-emption is to occur or not and indicates the result of the determination to the physical layer.

In some embodiments, the MAC layer entity 850 indicates to the PHY protocol entity 860 whether a MAC TB may be pre-empted, during its transmission, by a subsequent MAC TB. In some such embodiments, the MAC layer entity 850 may indicate to the PHY protocol entity 860 that a first MAC TB may be pre-empted, during its transmission, by a subsequent second MAC TB based on the logical channel(s) and/or priorities associated with the data contained in the first MAC TB. For example if the first MAC TB is associated does not contain any URLLC data and/or does not contain any data associated with the highest priority, the MAC protocol entity 850 may indicate that the first MAC TB may be pre-empted.

In some embodiments, one or both indications (whether pre-emption should occur by this MAC TB, and whether pre-emption is permitted by another MAC TB of this MAC TB) may be implicit and/or may be combined. For example, a single indication may indicate either i) that the MAC TB associated with this indication should pre-empt an ongoing transmission and that, during its transmission, the MAC TB should not be pre-empted, or ii) that the MAC TB associated with this indication should not pre-empt an ongoing transmission but that, during its transmission, the MAC TB may be pre-empted.

In some embodiment, the physical layer decides whether a later TB can pre-empt an ongoing TB. As per previous embodiments, the MAC layer provides information to the physical layer to indicate whether a MAC TB can pre-empt another TB. In such embodiments, the MAC layer does not need to know whether there is any ongoing transmission, it may, if this TB contains information from the new URLLC LCP, merely indicate to the PHY that the TB "can pre-empt others". The physical layer receiving this "can pre-empt others" indicator would then decide whether there is an ongoing transmission and then perform the pre-emption if necessary.

In some embodiments, the physical layer decides whether a later TB can pre-empt an ongoing TB. As per previous embodiments, the MAC layer provides information to the physical layer to indicate whether a MAC TB is non-pre-emptable (i.e. it cannot be pre-empted by another TB). Again, in such embodiments, the MAC layer does not need to know whether there is any ongoing transmission. Rather, if this TB contains information from the new URLLC LCP, it indicates that this TB is "non-pre-emptable". The physical layer receiving this "non-pre-emptable" indicator would then decide whether there a new arrived TB should pre-empt an ongoing transmission.

In some embodiment, the physical layer decides whether a later TB can pre-empt an ongoing TB. As per previous embodiments, the MAC layer provides information to the physical layer to indicate whether a MAC TB can pre-empt another TB or is non-pre-emptable. The MAC layer does not need to know whether there is any ongoing transmission. If a TB contains information from the new URLLC LCP it indicates that the TB "can pre-empt others" and is "non-pre-emptable". The physical layer noting these indicators would then decide whether a new arrived TB should pre-empt an ongoing transmission.

Figure 7:
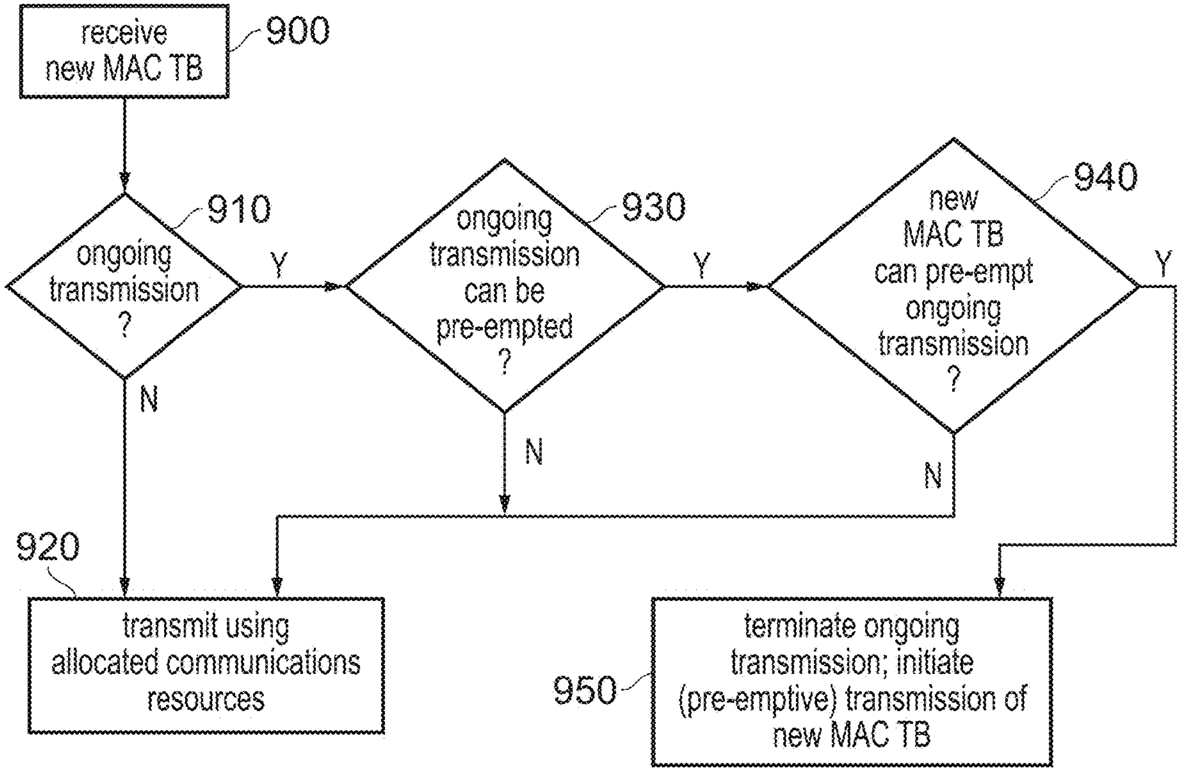
FIG. 7 illustrates a process for a communications device 101 for transmitting high priority data in accordance with embodiments of the present technique.

FIG. 7 illustrates a process for a communications device 101 for transmitting high priority data in accordance with embodiments of the present technique.

The process starts at step 900 at which the PHY protocol entity 860 receives a MAC TB ('new MAC TB') from the MAC protocol entity 850. The MAC protocol entity 850 may additionally indicate i) whether the new MAC TB may be pre-empted during its transmission and/or ii) whether the new MAC TB can pre-empt an ongoing transmission.

At step 910, the PHY protocol entity 860 determines whether there is an ongoing transmission or one which is imminent, for another MAC TB (an 'earlier MAC TB'). There may be no ongoing or imminent transmission if all earlier MAC TBs have been transmitted on the wireless access interface. If there is no such ongoing or imminent transmission, the control passes to step 920.

In step 920 the new MAC TB is processed and transmitted using communications resources, such as those determined in step 610 of the process of FIG. 6, determined as being for the transmission of the new MAC TB, irrespective of any ongoing or imminent transmission of an earlier MAC TB.

If at step 910 it is determined that a transmission of an earlier MAC TB is ongoing or imminent, then control passes to step 930.

At step 930, it is determined whether or not the transmission of the earlier MAC TB may be pre-empted, for example, based on an indication received by the PHY protocol entity 860 from the MAC protocol entity 850 associated with the earlier MAC TB.

If it is determined that the transmission of the earlier MAC TB may not be pre-empted, the control passes to step 920, as described above. Otherwise, control passes to step 940.

At step 940, it is determined whether or not the transmission of the new MAC TB can pre-empt any ongoing transmission, for example, based on an indication received by the PHY protocol entity 860 from the MAC protocol entity 850 associated with the new MAC TB. If it is determined that the new MAC TB cannot pre-empt any ongoing transmission, then control passes to step 920, as described above. Otherwise, control passes to step 950.

In step 950, the ongoing or imminent transmission of the earlier MAC TB is stopped and the transmission of the new MAC TB is initiated using communications resources previously determined to be for the transmission of the earlier MAC TB.

In some embodiments, a further determination of whether sufficient communications resources of those determined for the transmission of the earlier MAC TB remain available for the transmission of the new MAC TB may be carried out. If sufficient communications resources are not available, then the control may pass to step 920 irrespective of any determination at step 930 or step 940.

In some embodiments, one or more of the steps may be omitted, and in some embodiments the steps may be performed in a different logical order.

For example, in some embodiments, step 940 is omitted, and in response to a positive determination at step 930, control passes directly to step 950. In some embodiments, step 930 is omitted, and in response to a positive determination at step 910, control passes directly to step 940.

In some embodiments, in response to receiving a request for an allocation of communications resources, where the request indicates that high priority (e.g. URLLC) data is available for transmission, the infrastructure equipment allocates the communications resources and indicates a plurality of TBS from which the communications device 104 may select the TBS.

In some embodiments where the TBS may be selected by the transmitting entity (e.g. the communications device 104), the receiver (which may be the infrastructure equipment 101) may perform blind decoding of the received data in order to determine the selected TBS, and hence to decode the MAC TB 820.

In some embodiments, as described above, one or more of the indications regarding pre-emption (which may be substantially the same as provided to the PHY layer) may be sent to the network in a MAC header or subheader of the MAC protocol unit comprising the MAC TB. In response to determining, based on the indications, that the MAC TB includes high priority (e.g. URLLC) data, the infrastructure equipment 101 may expedite processing of the MAC TB and/or may allocate further uplink communications resources to the communications device 101.

In the processes described above, steps are described as being carried out by particular protocol entities. However, this is for clarity of description and the embodiments of the present technique are not so limited.

Similarly, buffers, such as the buffers 801-804 may be logical buffers, and may be provided by shared memory or any other known technique.

In some embodiments, such as those described above, the transmission of the high priority data is by a communications device to an infrastructure equipment in a wireless communications network. However, the scope of the present disclosure is not so limited; for example, in some embodiments, the transmission of the high priority data may be to a communications device, and/or may be by an infrastructure equipment.

Thus there has been described a method for transmitting data by a communications device in a wireless communications network, the method comprising assigning one of a plurality of logical channel priorities to the data in accordance with a plurality of service types, the logical channel priorities providing at least an indication of high priority data and lower priority data, forming a transport block of the data for transmission at a medium access control protocol layer in accordance with the logical channel priorities, and passing the transport block from the medium access control protocol layer to a physical layer for transmission and providing an indication to the physical layer based on the logical channel priority of the data in the transport block.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communication devices/IoT devices or other narrowband communications devices, but can be applied more generally, for example in respect of any type communications device operating with a wireless link to the communication network.

It will further be appreciated that the principles described herein are not applicable only to LTE-based wireless telecommunications systems, but are applicable for any type of wireless telecommunications system that supports a random access procedure comprising an exchange of random access procedure messages between a communications device and a base station.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs: Paragraph 1. A method for transmitting data by a communications device in a wireless communications network, the method comprising assigning one of a plurality of logical channel priorities to the data in accordance with a plurality of service types, the logical channel priorities providing at least an indication of high priority data and lower priority data, forming a transport block of the data for transmission at a medium access control protocol layer in accordance with the logical channel priorities, and passing the transport block from the medium access control protocol layer to a physical layer for transmission and providing an indication to the physical layer based on the logical channel priority of the data in the transport block.

Paragraph 2. A method according to paragraph 1, wherein the providing the indication to the physical layer based on the logical channel priority of the data in the transport block comprises providing the indication to the physical layer based on the logical channel priority of the data in the transport block when the transport block comprises the high priority data.

Paragraph 3. A method according to paragraph 1 or 2, wherein the indication provided to the physical layer comprises an indication that the transmission of the transport block is not to be pre-empted by the transmission of another transport block.

Paragraph 4. A method according to any of paragraphs 1 to 3, wherein the indication provided to the physical layer comprises an indication that the transmission of the transport block is to pre-empt the transmission of another transport block.

Paragraph 5. A method according to any of paragraphs 1 to 4, wherein the indication to the physical layer based on the logical channel priority of the data in the transport block is for transmission with the data in the transport block.

Paragraph 6. A method according to any of paragraphs 1 to 5, wherein the forming the transport block of the data for transmission at the medium access control protocol layer in accordance with the logical channel priorities comprises: determining an amount of the high priority data available for uplink transmission, determining that lower priority data, having a priority lower than the high priority data, is available for uplink transmission, forming the transport block, the transport block comprising some or all of the determined amount of the high priority data and containing no lower priority data, irrespective of the determined amount of the high priority data with respect to a size of the transport block.

Paragraph 7. A method according to any of paragraphs 1 to 6, the method comprising: determining that no communications resources have been allocated for transmitting the signals representing the high priority data, and in response to determining that no communications resources have been allocated, transmitting a request for an allocation of communications resources, wherein the request comprises an indication that high priority data is available for uplink transmission.

Paragraph 8. A method according to any of paragraphs 1 to 7, the method comprising: receiving an allocation of communications resources for the transmission of the transport block, the allocation of communications resources being associated with a plurality of permitted transport block sizes, and selecting a transport block size from the plurality of permitted transport block sizes, wherein forming the transport block of the data for transmission at the medium access control protocol layer in accordance with the logical channel priorities comprises forming the transport block of the data in accordance with the selected transport block size.

Paragraph 9. A method according to paragraph 8, wherein each of the plurality of permitted transport block sizes correspond to a row entry of a respective one of a plurality of predetermined tables of encoding parameters, each of the row entries being associated with a same row number, and selecting a transport block size from the plurality of permitted transport block sizes comprises selecting the transport block size based on whether high priority data is available for transmission.

Paragraph 10. A method according to any of paragraphs 1 to 9, the method comprising transmitting signals representing the transport block.

Paragraph 11. A method according to paragraph 10, the method comprising: determining communications resources for the transmission of signals representing a second transport block; wherein transmitting the signals representing the transport block comprises, when the transport block comprises the high priority data, transmitting the signals using the determined communications resources for the transmission of the signals representing the second transport block.

Paragraph 12. A method according to any of paragraphs 1 to 11, wherein the high priority data is associated with a first logical channel, and the lower priority data is associated with one or more other logical channels, the method comprising: for each of the one or more other logical channels, determining whether a data rate limit associated with the logical channel is exceeded and if the data rate limit associated with the logical channel is exceeded, limiting a rate at which the lower priority data is transmitted, and for the first logical channel, refraining from determining that a rate at which the high priority data can be transmitted is limited by a data rate limit.

Paragraph 13. A method according to paragraph 12, wherein one or more of the data rate limits is determined based on a product of a prioritised bit rate and a bucket size duration.

Paragraph 14. A method according to any of paragraphs 1 to 13, wherein the lower priority data comprises one or more of a radio resource control signalling message and a non access stratum protocol signalling message.

Paragraph 15. A method according to any of paragraphs 1 to 14, wherein the lower priority data comprises data associated with a signalling radio bearer.

Paragraph 16. A method according to any of paragraphs 1 to 15, wherein the wireless communications network provides connectivity to destinations outside of the wireless communications network, and the high priority data comprises data having a destination outside of the wireless communications network.

Paragraph 17. A method according to any of paragraphs 1 to 16, wherein the high priority data is associated with a one or both of a requirement for a maximum transmission latency of around 1 millisecond and a requirement for a minimum probability of transmission success of around 99.999% or around 99.9999%.

Paragraph 18. A method for transmitting data by a communications device in a wireless communications network which provides connectivity to destinations outside of the wireless communications network, the method comprising: determining that first data having a destination outside of the wireless communications network is available for uplink transmission, determining that second data, having a destination within the wireless communications network, is available for uplink transmission, forming a transport block, the transport block comprising the first data in preference to the second data, and transmitting signals representing the transport block.

Paragraph 19. A method according to paragraph 18, wherein the second data, having a destination within the wireless communications network, comprises one or more of a radio resource control signalling message, a non access stratum protocol signalling message, a packet data convergence protocol signalling message, a radio link control (RLC) signalling message and a medium access control signalling message.

Paragraph 20. A method according to paragraph 18 or paragraph 19, wherein the second data, having a destination within the wireless communications network, comprises data associated with a signalling radio bearer.

Paragraph 21. A method according to any of paragraphs 18 to 20, wherein the first data having a destination outside of the wireless communications network is associated with a one or both of a requirement for a maximum transmission latency of around 1 millisecond and a requirement for a minimum probability of transmission success of around 99.999% or around 99.9999%.

Paragraph 22. A method for receiving data in a wireless communications network, the method comprising: receiving a request for an allocation of communications resources, wherein the request comprises an indication that high priority data is available for transmission, in response to receiving the request, transmitting an allocation of communications resources for a transmission of a transport block, the allocation of communications resources being associated with a plurality of permitted transport block sizes, receiving signals representing the transport block on the allocated communications resources, the transport block formed in accordance with one of the plurality of permitted transport block sizes, and determining the one of the plurality of permitted transport block sizes.

Paragraph 23. A method according to paragraph 22, the method comprising receiving with the transport block an indication that the transport block comprises the high priority data, and in response to receiving the indication, processing the transport block in accordance with the indication.

Paragraph 24. A method according to paragraph 22 or paragraph 23, wherein the wireless communications network provides connectivity to destinations outside of the wireless communications network, and the high priority data comprises data having a destination outside of the wireless communications network.

Paragraph 25. A method according to any of paragraphs 22 to 24, wherein the high priority data is associated with a one or both of a requirement for a maximum transmission latency of around 1 millisecond and a requirement for a minimum probability of transmission success of around 99.999% or around 99.9999%.

Paragraph 26. A communications device for use in a wireless communications network, the communications device comprising a transmitter configured to transmit signals, a receiver configured to receive signals, and a controller configured to control the transmitter and the receiver so that the communications device is operable: to assign one of a plurality of logical channel priorities to the data in accordance with a plurality of service types, the logical channel priorities providing at least an indication of high priority data and lower priority data, to form a transport block of the data for transmission at a medium access control protocol layer in accordance with the logical channel priorities, and to pass the transport block from the medium access control protocol layer to a physical layer for transmission and providing an indication to the physical layer based on the logical channel priority of the data in the transport block.

Paragraph 27. Circuitry for a communications device for use in a wireless communications network, the circuitry comprising transmitter circuitry configured to transmit signals, receiver circuitry configured to receive signals, and controller circuitry configured to control the transmitter circuitry and the receiver circuitry so that the communications device is operable: to assign one of a plurality of logical channel priorities to the data in accordance with a plurality of service types, the logical channel priorities providing at least an indication of high priority data and lower priority data, to form a transport block of the data for transmission at a medium access control protocol layer in accordance with the logical channel priorities, and to pass the transport block from the medium access control protocol layer to a physical layer for transmission and providing an indication to the physical layer based on the logical channel priority of the data in the transport block.

Paragraph 28. A communications device for use in a wireless communications network, the communications device comprising a transmitter configured to transmit signals, a receiver configured to receive signals, and a controller configured to control the transmitter and the receiver so that the communications device is operable: to determine that first data having a destination outside of the wireless communications network is available for uplink transmission, to determine that second data, having a destination within the wireless communications network, is available for uplink transmission, to form a transport block, the transport block comprising the first data in preference to the second data, and to transmit signals representing the transport block.

Paragraph 29. Circuitry for a communications device for use in a wireless communications network, the circuitry comprising transmitter circuitry configured to transmit signals, receiver circuitry configured to receive signals, and controller circuitry configured to control the transmitter circuitry and the receiver circuitry so that the communications device is operable: to determine that first data having a destination outside of the wireless communications network is available for uplink transmission, to determine that second data, having a destination within the wireless communications network, is available for uplink transmission, to form a transport block, the transport block comprising the first data in preference to the second data, and to transmit signals representing the transport block.

Paragraph 30. Infrastructure equipment for use in a wireless communications network, the infrastructure equipment comprising a transmitter configured to transmit signals, a receiver configured to receive signals, and a controller, configured to control the transmitter and the receiver so that the infrastructure equipment is operable: to receive a request for an allocation of communications resources, wherein the request comprises an indication that high priority data is available for transmission, in response to receiving the request, to transmit an allocation of communications resources for a transmission of a transport block, the allocation of communications resources being associated with a plurality of permitted transport block sizes, to receive signals representing the transport block on the allocated communications resources, the transport block formed in accordance with one of the plurality of permitted transport block sizes, and to determine the one of the plurality of permitted transport block sizes.

Paragraph 31. Circuitry for an infrastructure equipment for use in a wireless communications network, the circuitry comprising transmitter circuitry configured to transmit signals, receiver circuitry configured to receive signals, controller circuitry, configured to control the transmitter circuitry and the receiver circuitry so that the infrastructure equipment is operable: to receive a request for an allocation of communications resources, wherein the request comprises an indication that high priority data is available for transmission, in response to receiving the request, to transmit an allocation of communications resources for a transmission of a transport block, the allocation of communications resources being associated with a plurality of permitted transport block sizes, to receive signals representing the transport block on the allocated communications resources, the transport block formed in accordance with one of the plurality of permitted transport block sizes, and to determine the one of the plurality of permitted transport block sizes.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP TS 38.300 v. 15.2.0 "NR; NR and NG-RAN Overall Description; Stage 2(Release 15)", June 2018

[2] Holma H. and Toskala A, "LTE for UMTS OFDMA and SC-FDMA based radio access", John Wiley and Sons, 2009

[3] 3GPP TR 38.913, "Study on Scenarios and Requirements for Next Generation Access Technologies (Release 14)".

[4] 3GPP TS 38.214 "NR; Physical layer procedures for data (Release 15)", version 15.2.0

What is claimed is:

1. A method for transmitting data by a communications device in a wireless cellular communications network which provides connectivity to destinations outside of the wireless cellular communications network, the method comprising:

determining that first data having a destination outside of the wireless cellular communications network is available for uplink transmission, determining that second data, having a destination within the wireless cellular communications network, is available for uplink transmission, forming a transport block, the transport block comprising the first data in preference to the second data, and transmitting signals representing the transport block.

2. The method according to claim 1, wherein the second data, having a destination within the wireless cellular communications network, comprises one or more of a radio resource control signalling message, a non access stratum protocol signalling message, a packet data convergence protocol signalling message a radio link control (RLC) signalling message, and a medium access control signalling message.

3. The method according to claim 1, wherein the second data, having a destination within the wireless cellular communications network, comprises data associated with a signalling radio bearer.

4. The method according to claim 1, wherein the first data having a destination outside of the wireless cellular communications network is associated with a one or both of a requirement for a maximum transmission latency of around 1 millisecond and a requirement for a minimum probability of transmission success of around 99.999% or around 99.9999%.

5. The method according to claim 1, wherein the transport block includes all of the first data and at least some of the second data.

6. The method according to claim 1, wherein the transport block includes all of the first data and none of the second data irrespective of whether a size of the transport block accommodates at least some of the second data together with all of the first data.

7. The method according to claim 1, wherein a size of the transport block is based, at least in part, on an amount of the first data.

8. The method according to claim 7, wherein the size of the transport block is selected from a plurality of permitted transport block sizes.

9. The method according to claim 8, wherein each of the plurality of permitted transport block sizes correspond to a row entry of a respective one of a plurality of predetermined tables of encoding parameters, each of the row entries being associated with a same row number.

10. The method according to claim 1, wherein the first data is associated with a signaling radio bearer.

11. The method according to claim 1, wherein the second data is associated with a signaling radio bearer.

12. The method according to claim 1, wherein the first data and the second data are associated with different logical channels.

13. The method according to claim 1, wherein the first data is associated with a logical channel having a higher priority than a logical channel associated with the second data.

14. The method according to claim 1, further comprising:

assigning a logical channel to each of the first data and the second data based on a service type associated with each of the first data and the second data.

15. The method according to claim 14, wherein the logical channel assigned to each of the first data and the second data has an associated priority.

16. The method according to claim 15, wherein the associated priority associated with the logical channel assigned to each of the first data and the second data provides an indication of high priority data or low priority data.

17. The method according to claim 16, further comprising:

providing the indication of high priority data or low priority data to a physical layer based on the associated priority associated with the logical channel assigned to each of the first data and the second data.

18. The method according to claim 17, wherein the indication provided to the physical layer includes an indication that the transport block is not to be pre-empted.

19. A communications device for use in a wireless cellular communications network, the communications device comprising:

a transmitter configured to transmit signals, a receiver configured to receive signals, and a controller configured to control the transmitter and the receiver so that the communications device is operable:

to determine that first data having a destination outside of the wireless cellular communications network is available for uplink transmission, to determine that second data, having a destination within the wireless cellular communications network, is available for uplink transmission, to form a transport block, the transport block comprising the first data in preference to the second data, and to transmit signals representing the transport block.

* * * * *